United States Patent
Andrews

(10) Patent No.: US 7,092,451 B2
(45) Date of Patent: Aug. 15, 2006

(54) INFORMATION HIDING SYSTEM AND A METHOD OF HIDING INFORMATION IN A WIRELESS COMMUNICATION NETWORK

(75) Inventor: Michael R. Andrews, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 803 days.

(21) Appl. No.: 10/195,014

(22) Filed: Jul. 12, 2002

(65) Prior Publication Data

US 2004/0008796 A1 Jan. 15, 2004

(51) Int. Cl.
*H04B 7/02* (2006.01)
*H04L 1/02* (2006.01)

(52) U.S. Cl. ............... 375/267; 375/260; 455/132; 455/504

(58) Field of Classification Search ............ 375/267, 375/260, 130, 144, 148, 285, 346, 347; 455/132, 455/504; 708/703, 704, 48, 746
See application file for complete search history.

(56) References Cited

U.S. PATENT DOCUMENTS

| 5,185,793 | A  | * | 2/1993 | Marland et al. ......... 380/210 |
| 5,550,809 | A  | * | 8/1996 | Bottomley et al. ...... 370/342 |
| 5,793,907 | A  | * | 8/1998 | Jalali et al. ............. 385/24 |
| 6,937,592 | B1 | * | 8/2005 | Heath et al. ............ 370/342 |
| 2002/0132642 | A1 | * | 9/2002 | Hines et al. ............ 455/562 |
| 2003/0020648 | A1 | * | 1/2003 | Fienup .................... 342/25 |

OTHER PUBLICATIONS

Alfred O. Hero "Secure Space-Time Communication" IEEE Transactions on Information Theory; Apr. 2001; pp. 1-37.

* cited by examiner

*Primary Examiner*—Jean B. Corrielus
*Assistant Examiner*—Erin M. File

(57) ABSTRACT

For use in a wireless communication network that includes a transmitter having a multi-element transmit antenna array, an information hiding system and a method of hiding information. In one embodiment, the information hiding system includes an information spreading subsystem that is configured to scramble the information across the multi-element transmit antenna array. The information hiding system further includes a coherence modification subsystem that is configured to reduce channel coherence randomly during transmission of the scrambled information via the multi-element transmit antenna array. By hiding the information, the information hiding system advantageously reduces an unauthorized eavesdropper's ability to determine the contents of the transmitted information.

21 Claims, 3 Drawing Sheets

INFORMATION HIDING SYSTEM AND A METHOD OF HIDING INFORMATION IN A WIRELESS COMMUNICATION NETWORK

TECHNICAL FIELD OF THE INVENTION

The present invention is directed, in general, to a wireless communication network and, more specifically, to a wireless communication network that includes a transmitter having multiple antennas.

BACKGROUND OF THE INVENTION

New wireless communication networks require higher data rates and lower bit error rates to provide an acceptable quality of service level. To achieve higher data rates, vendors have employed systems that use multiple transmit and receive antennas that increase the capacity of wireless channels. These multiple transmit and receive antenna systems may be used to combat and mitigate the destructive effects of multi-path fading, but the decoding complexity often increases as the number of transmit and receive antennas increases. Also, the multiple transmit and receive antenna systems may employ space-time diversity to code blocks of data and disperse the blocks across the multiple antennas effectively increasing the number of wireless channels available.

While the increased channel capacity and higher throughput are relevant to vendors, there is also a need for increasing network security to ensure data privacy, reliable user authentication and protection of information from unauthorized eavesdroppers over wireless communications. The communication industry is inadvertently helping the unauthorized eavesdropper by the standardization of coding schemes employed in wireless networks.

Accordingly, what is needed in the art is a system that decreases the likelihood of an unauthorized eavesdropper from determining the information transmitted over multiple transmit antennas.

SUMMARY OF THE INVENTION

To address the above-discussed deficiencies of the prior art, the present invention provides, for use in a wireless communication network that includes a transmitter having a multi-element transmit antenna array, an information hiding system, a method of hiding information, and a wireless communication network employing the information hiding system and method. In one embodiment, the information hiding system includes an information spreading subsystem configured to scramble the information across the multi-element transmit antenna array. The information hiding system further includes a coherence modification subsystem configured to reduce channel coherence randomly during transmission of the scrambled information via the multi-element transmit antenna array. The present invention also provides, in one embodiment, a receiver for use in a wireless communication network that includes a coherence policer that is configured to determine when the receiver produces an unacceptable of number of errors when decoding scrambled information and send a signal indicating that channel coherence should be re-adjusted. For purposes of the present invention, the phrase "configured to" means that the device, the system or the subsystem includes the necessary software, hardware, firmware or a combination thereof to accomplish the stated task.

In another embodiment, the present invention provides a method of hiding information for use in a wireless communication network that includes a transmitter having a multi-element transmit antenna array. The method includes scrambling the information across the multi-element transmit antenna array, and reducing channel coherence randomly during transmission of the scrambled information via the multi-element transmit antenna array.

The present invention also provides, in one embodiment, a wireless communication system for hiding information from an unauthorized eavesdropper. The wireless communication system includes a transmitter having a multi-element transmit antenna array and an information hiding system. The information hiding system includes an information spreading subsystem, a coherence modification subsystem and a coherence monitoring subsystem. The information spreading subsystem scrambles the information across the multi-element transmit antenna array. The coherence modification subsystem reduces channel coherence randomly during transmission of the scrambled information via the multi-element transmit antenna array. The coherence monitoring subsystem determines when the scrambled information produces an unacceptable number of errors when decoded at a receiver and causes the coherence modification subsystem to re-adjust the channel coherence in order to re-establish valid communications.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
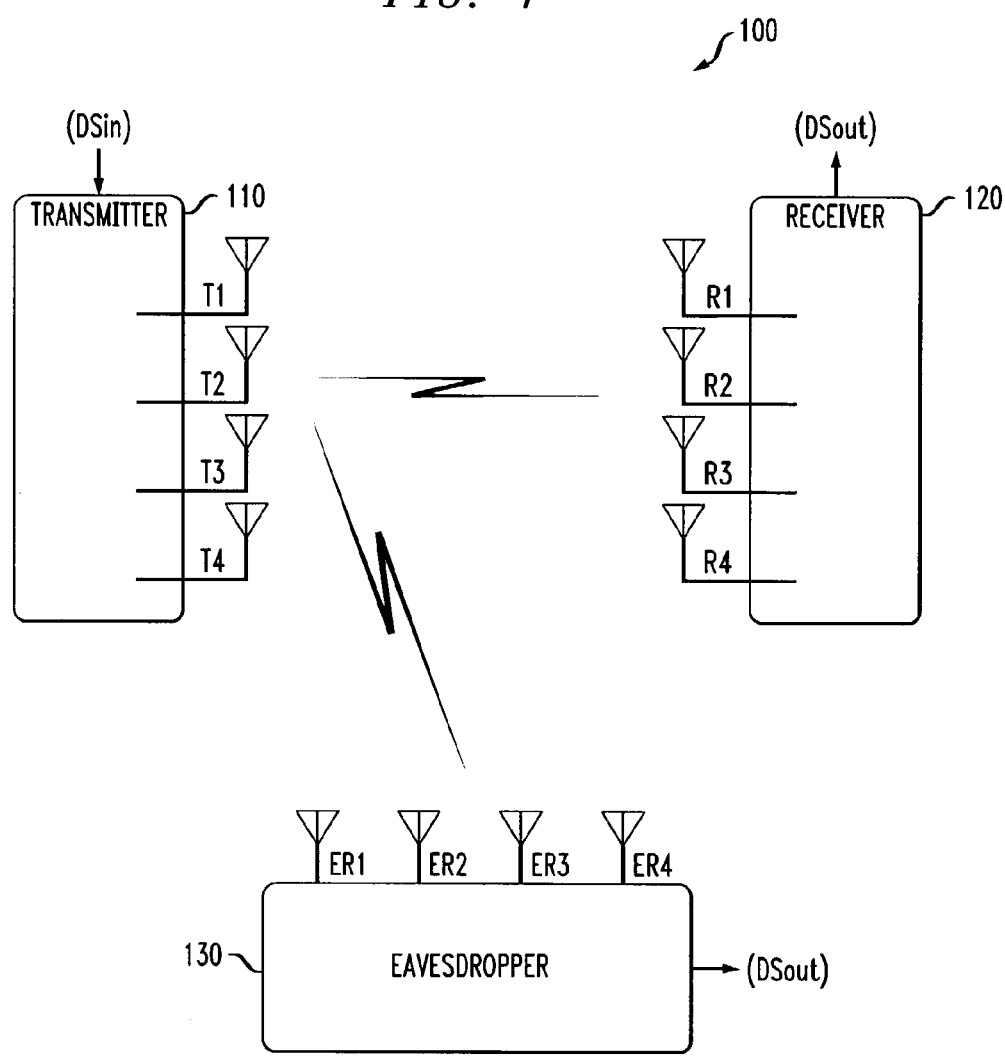
FIG. 1 illustrates a block diagram of a wireless communication network constructed in accordance with the principles of the present invention.

Referring initially to FIG. 1, illustrated is a block diagram of a wireless communication network, generally designated 100, constructed in accordance with the principles of the present invention. The wireless communication network 100 includes a transmitter 110 having a multi-element transmit antenna array T1–T4. The transmitter 110 encodes an input data stream DSin and transmits the encoded data stream using the multi-element transmit antenna array T1–T4. In the illustrated embodiment, the wireless communication network 100 also includes a receiver 120 having a multi-element receive antenna array R1–R4. In another embodiment, the receiver 120 may have one receive antenna. The receiver 120 employs its multi-element receive antenna array R1–R4 to receive the encoded data stream from the transmitter 110 and decodes the encoded data stream into an output data stream DSout. One skilled in the art is familiar with transmitting and receiving data using multi-element antenna arrays.

The unauthorized eavesdropper 130, if positioned in the correct area, can also receive the encoded data stream from the transmitter 110 by employing a receiver that is similar to the receiver 120. Knowing the transmission scheme, protocols and employing fast computers, the unauthorized eavesdropper 130 may be able to decode the encoded data stream into his own output data stream DSout. Given the output data stream DSout, the unauthorized eavesdropper 130 may then decrypt the data if encrypted and examine the data, and thereby compromising the security of the wireless communication network 100.

An unintentional benefit for the unauthorized eavesdropper 130 may occur once the transmitter 110 adjusts for reflections from obstacles and interferences, which may then cause the transmission from the transmitter 110 to the receiver 120 to achieve a stabilized channel coherence during transmission. This stabilized channel coherence enhances the ability of the unauthorized eavesdropper 130 to detect the transmissions from the transmitter 110. However, if the unauthorized eavesdropper 130 is unable to detect the transmission, the unauthorized eavesdropper 130 cannot decode the transmission. The present invention advantageously reduces the ability of the unauthorized eavesdropper 130 to detect the transmission by artificially reducing the channel coherence. The reduction of the channel coherence is discussed in more detail in FIG. 2.

Figure 2:
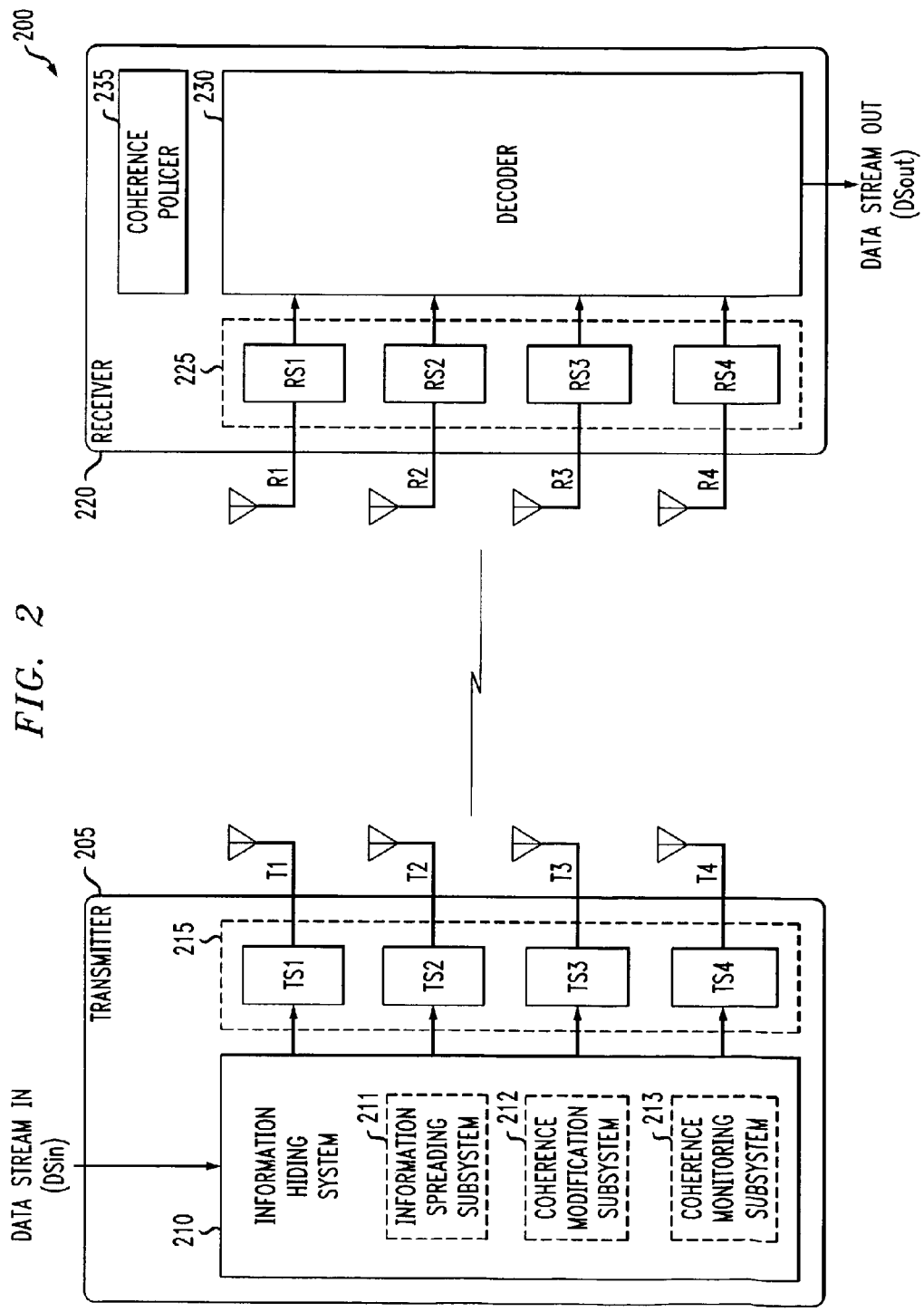
FIG. 2 illustrates a block diagram of a wireless communication system for hiding information from an unauthorized eavesdropper constructed in accordance with the principles of the present invention.

Turning now to FIG. 2, illustrated is a block diagram of a wireless communication system, generally designated 200, for hiding information from an unauthorized eavesdropper constructed in accordance with the principles of the present invention. The wireless communication system 200 includes a transmitter 205 that encodes an input data stream DSin and transmits it, using a multi-element transmit antenna array, to a receiver 220 that receives the transmission and decodes it into an output data stream DSout.

The transmitter 205 includes an information hiding system 210 and a transmit subsystem 215. In the illustrated embodiment, the transmit subsystem 215 includes first, second, third and fourth transmit sub-channels TS1, TS2, TS3, TS4 that may include frequency tuning, modulation and power amplification circuitry required to condition and transmit an encoded data stream on that sub-channel. The transmit subsystem 215 may also employ a multi-element transmit antenna array having first, second, third and fourth transmit antenna elements T1, T2, T3, T4. Each of the transmit antenna elements T1–T4 is associated with corresponding ones of the transmit sub-channels TS1–TS4. In other embodiments, the multi-element transmit antenna array by have at least two transmit antenna elements and the transmit subsystem 215 may have a matching number of transmit sub-channels. The multi-element transmit antenna array may also be a plurality of individual transmit antenna working in concert. Of course, however, the present invention is not limited to four transmit antenna elements and may have any number of transmit antenna elements.

The receiver 220 includes a receive subsystem 225 and a decoder 230. The receive subsystem 225 includes first, second, third and fourth receive sub-channels RS1, RS2, RS3, RS4. The receive sub-channels RS1–RS4 include required capture, detection and recovery circuitry to allow processing of the four sub-channel data streams into a signal configuration that may be readily employed by the receive decoder 230. The receive subsystem 225 also employs the multi-element receive antenna array having first, second, third and fourth receive antenna elements R1, R2, R3, R4. Each of the receive antenna elements R1–R4 is associated with corresponding ones of the receive sub-channels RS1–RS4. The receive decoder 230 decodes the output of the four sub-channels RS1–RS4 into the output data stream DSout. The receive decoder 230 may be a conventional decoder for a multi-element receive antenna array. In another embodiment, the receiver 220 may have only one receive antenna with an associated conventional decoder. In yet another embodiment, the receiver 220 may have a multi-element receive antenna array having any number of receive antenna elements. The multi-element receive antenna array may also be a plurality of individual receive antenna working in concert.

In the illustrated embodiment, the input data stream DSin is a stream of information supplied to the transmitter 205 for encoding and transmission to the receiver 220. The information hiding system 210 is configured to convert the input data stream DSin into transmitted signal vectors $T_i$, where the index i references one of the elements of the multi-element transmit antenna array. The elements of the transmitted signal vector $T_i$ include complex-valued numbers whose real and imaginary parts represent the in-phase and quadrature components of the transmitted radio frequency (RF) signal. If the RF signals on the various elements of the multi-element transmit antenna array ($y_i$) over time (t) are denoted by $y_i$ (t), then:

$$y_i(t) = \Re(\exp(j\omega t) * T_i(t)) = \cos(\omega t) * \Re(T_i(t)) - \sin(\omega t) * \Im(T_i(t))$$

where $\Re$ and $\Im$ denote the "real" and "imaginary" parts of the complex-valued expressions respectively, $j=\sqrt{-1}$ and $\omega$ is the angular frequency of the carrier wave. Related received signal vectors $R_i$ are similarly defined. In another embodiment, the conversion to transmitted signal vectors may be performed by conventional encoder. One skilled in the pertinent art is familiar with transmitted signal vectors and received signal vectors.

In the illustrated embodiment, the information hiding system 210 also includes an information spreading subsystem 211, a coherence modification subsystem 212 and a coherence monitoring subsystem 213. The information spreading subsystem 211 is configured to spread or scramble the information across the multi-element transmit antenna array T1–T4 of the transmitter 205. In one embodiment, the information spreading subsystem 211 employs a channel matrix to scramble the transmission. The channel matrix $H_{ij}$ (I=transmitter, j=receiver) is a matrix of the channel characteristics and specifies all the complex amplitudes that relate each transmitted amplitude, $T_i$ to each received amplitude, $R_j$, such that:

$$R_i = \sum_{j=0}^{n} H_{ij} * T_j$$

where n is the number of antennas at the transmitter (the number of receiving antennas is left unspecified). If a summation is implicitly performed over any index that is repeated and the index j is repeated, the above equation can be simplified to $R_i = H_{ij} T_j$. Thus, the channel matrix $H_{ij}$ (also called H) represents how information is to be scrambled in order to communicate using multi-element antenna arrays.

The channel matrix H is also a function of time t and can be written as H(t). If H varies too fast, the receiver 220 will be unable to communicate coherently or not at all. If H is relatively constant, the communication between the transmitter 205 and the receiver 220 is unhampered. The reason that H affects communication is that in order to decode the information by observing $R_i$, the receiver 220 must have an idea of how the transmitter 205 is scrambling the signal. If $H_{ij}$ during any particular moment is a random matrix with independently Gaussian random matrix elements, then during that moment H may be measured and by applying an inverse of H to $R_i$, T might be recovered. In other words:

$$T_i \approx H_{ik}^{-1} R_k,$$

where k and l are indices of antennas to be summed over.

The characteristics of the channel may be measured through pilots. A pilot is a known transmitted signal that enables a receiver to measure the channel. For example, a pilot for a two antenna channel could be $T_0(0)=1$, $T_1(0)=0$, $T_0(1)=0$, and $T_1(1)=1$, or in other words, $T_i(t=j)=\delta_{ij}$, which is an identity matrix. In this case, after traversing the channel, $R_0(0)=H_{00}$, $R_0(1)=H_{01}$, $R_1(0)=H_{10}$, $R_1(1)=H_{11}$, and that part of the matrix $R_{ij}$ simply measures $H_{ij}$. The rest of the T's after t=1 (i.e., $T_1(2)$, $T_i(3)$, ... ) will then contain the data. After going through the channel, then $R_i = H_{ij} T_j$. However, since the above procedure provides an estimate for H, the receiver can guess T by computing $$H_{ij}^{-1} * R_j \approx T_i.$$

However, if H(t) changes too fast, then the above procedure becomes harder and harder until H(t) cannot be predicted and the channel cannot carry meaningful information. Changing H(t) somewhere in-between the fast and slow points allow the system to accommodate a fluctuating channel, while still allowing the receiver to recover the original information sent. The criteria for maintaining enough coherence in the channel may be stated as:

$$n\partial(\log H(t))/\partial t < B$$

where n is the number of antenna and B is the bandwidth of the signal.

The information spreading subsystem 211, in another embodiment, may employ space-time diversity to scramble the information across the multi-element transmit antenna array T1–T4. For example, given that the transmitted signals are complex valued T×M matrices whose rows span T time samples and whose columns span M space samples equal to the number of transmit antennas, then the information can be hidden by restricting the space-time modulation to a class of complex transmitted matrices that has a spacial inner product that is equal to a consent T×T matrix. Stated differently, if the transmitter employs a signaling scheme that uses a constellation S={S} having constant spacial inner product of SS$^\dagger$=A, where A is a prespecified non-random T×T matrix.

When A is a diagonal, then many known signal constellations $\{S_i\}_i$ would satisfy the property.

Some examples include doubly unitary codes (T≥M) where:

$$S_i^\dagger S_i = I_M, S_i S_i^\dagger = \begin{bmatrix} I_M & 0 \\ 0 & 0 \end{bmatrix}.$$

Some instances of such codes are:
Square unitary codes (T=M): $S_i S_1^\dagger = S_1^\dagger S_i = I_M$ and
Space Time QSPK: Quaternion codes: (T=M=2):

$$S = \left\{ \pm \begin{bmatrix} 1 & 0 \\ 0 & 1 \end{bmatrix}, \pm \begin{bmatrix} i & 0 \\ 0 & -j \end{bmatrix}, \pm \begin{bmatrix} 0 & 1 \\ -1 & 0 \end{bmatrix}, \pm \begin{bmatrix} 0 & j \\ j & 0 \end{bmatrix} \right\}$$

Additional information on space-time coding and double unitary codes is discussed in "Secure Space-Time Communication," by Alfred O. Hero, IEEE Transactions on Information Theory (April 2001), which is incorporated herein by reference.

The coherence modification subsystem 212 is configured to receive the scrambled information from the information spreading subsystem 211. The coherence modification subsystem 212 is further configured to reduce channel coherence randomly during the transmission of the scrambled information via the multi-element transmit array T1–T4 of the transmitter 205. In another embodiment, the coherence modification subsystem 212 is further configured to reduce the channel coherence by pre-multiplying the scrambled information by a random matrix, which is indistinguishable when transmitted, before the scrambled information is sent to the transmit subsystem 215 for transmission via the multi-element transmit antenna array T1–T4. In yet another embodiment, the coherence modification subsystem 212 may reduce the channel coherence between each element of the multi-element transmit antenna array T1–T4 and the elements of the multi-element receive antenna array R1–R4. Similarly, if the receiver 220 has one antenna, the coherence modification subsystem 212 may reduce the channel coherence between each element of the multi-element transmit antenna array R1–R4 and the single receive antenna of the receiver 220.

The random matrix, in a related embodiment, should be chosen such that:

$$n\partial(\log H(t)M(t))/\partial t < B$$

where n is the number of elements in the multi-element antenna array, t is time, H is the channel matrix, M is the random matrix and B is the signal bandwidth. The portion of the equation H(t)M(t) is the matrix multiplication $H_{ik}(t)M_{kj}(t)$ and thus the previous inequality holds for all matrix elements of the product. In determining the random matrix that satisfies the above inequality may involve generating a band-limit random variable by random summation of discrete prolate spheroidal sequences created to have a strict band-limiting property. One skilled in the art is familiar with discrete prolate spheroidal sequences and band-limiting.

For example, suppose there are 10 antennas, a bandwidth of 100 KHz, and a channel coherence over 1 ms (meaning the H(t) is roughly constant over 100 μs). This results in $n\partial(\log H(t))/\partial t \sim 10$ KHz, which is much less than 100 KHz. Therefore, the coherence modification subsystem 212 can artificially reduce the channel coherence to bring the left side of the prior inequality closer to 100 KHz. Now apply the random matrix inequality of $n\partial(\log H(t)M(t))/\partial t$, where $M(t)$ is a band-limited sequence of matrices. First choose $\partial(\log M(t))/\partial t \sim 50$ KHz, so that $n\partial(\log H(t)M(t))/\partial t \sim 60$ KHz, which means the channel is much less coherent than before. The new channel coherence is approaching the point in which the communication between the transmitter 205 and the receiver 220 might fail, at 100 KHz. Now, transmitting the scattered information over the less coherent channel hides the scattered information better than when the scattered information was more clearly transmitted through the more coherent channel, thus reducing an unauthorized eavesdropper's ability of detecting the transmission.

In another embodiment, the coherence modification subsystem 212 is configured to reduce the channel coherence by pre-multiplying the scrambled information by a series of random matrixes over a period of time that are indistinguishable when transmitted. In yet another embodiment, the coherence modification subsystem 212 may reduce the channel coherence below a stabilized channel coherence. As described previously, a stabilized channel coherence may occur when the transmitter 205 adjusts the transmissions for reflections from obstacles and for interferences. Having a stabilized channel coherence enhances the ability of an unauthorized eavesdropper to detect the transmissions from the transmitter 205. When the coherence modification subsystem 212 reduces the channel coherence below the stabilized channel coherence, the ability of the unauthorized eavesdropper to detect the transmission is also reduced. Of course, however, other methods of reducing the channel coherence are well within the broad scope of the present invention.

As stated above, the information hiding system 210 may also include the coherence monitoring subsystem 213 that is configured to determine when the scrambled information produces an unacceptable number of errors when decoded at a receiver, such as the receiver 220, and cause the coherence modification subsystem 212 to re-adjust the channel coherence in order to re-establish valid communications. For purposes of the present invention, producing an unacceptable number of errors when decoded means that the number of uncorrectable errors produced during the decoding of a transmission exceeds an acceptable limit set by a standard or by a designer of a wireless system. For example, in wireless voice transmissions, the number of unacceptable errors is typically one percent.

Upon the detection of communication failure with the receiver 220, the coherence monitoring subsystem 213 may adjust the random matrix M(t) in order to increase the channel coherence. In another embodiment, the coherence monitoring subsystem 213 may be embodied in both the transmitter 205 and the receiver 220. The portion of the coherence monitoring system 213 embodied in the receiver 220 may send signals back the transmitter 205 indicating the status or quality of the transmission to the receiver 220. The portion of the coherence monitoring system 213 embodied in the transmitter 205 would employ these signals to cause the coherence modification subsystem 212 to re-adjust the channel coherence if needed. In yet another embodiment, the coherence monitoring subsystem 213 may be able to determine when the scrambled information produces an unacceptable number of errors when decoded at any receiver. This may be determined by the receiver 220 not responding or may include additional circuitry to monitor the transmission itself.

In the illustrated embodiment, the receiver 220 may include a coherence policer 235. The coherence policer 235 is configured to determine when the receiver 220 produces an unacceptable of number of errors when decoding scrambled information and send a signal indicating that channel coherence should be re-adjusted. In another embodiment, the coherence policer 235 may determine when the receiver 220 produces an unacceptable of number of errors when decoding scrambled information from the transmitter 205 and send a signal to the coherence monitoring subsystem 213 of the transmitter indicating that the channel coherence should be re-adjusted. The coherence monitoring subsystem 213 would then employ this signal to cause the coherence modification subsystem 212 to re-adjust the channel coherence. In yet another embodiment, the signal indicating that the channel coherence should be re-adjusted could be received and employed by any device in the transmitter that is capable of employing the signal and causing the channel coherence to be re-adjusted.

Figure 3:
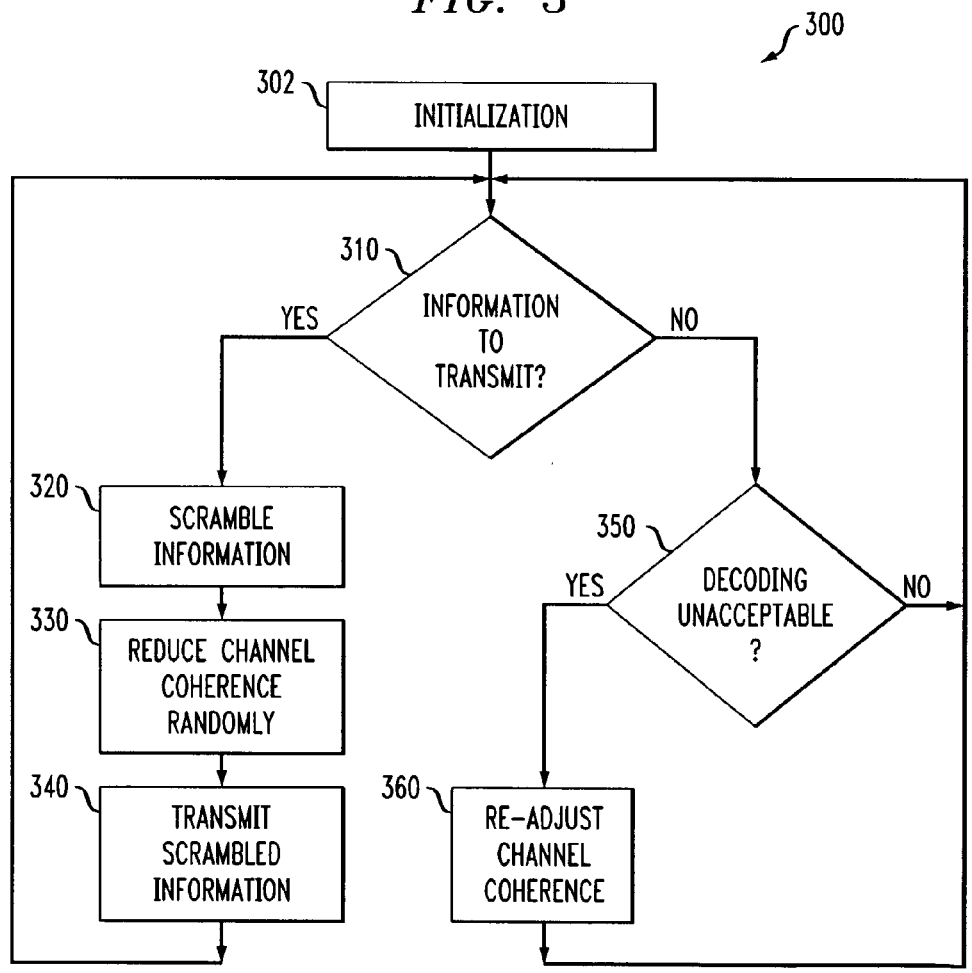
FIG. 3 illustrates a flow diagram of an embodiment of a method of hiding information for use in a wireless communication network conducted according to the principles of the present invention.

Turning now to FIG. 3, illustrated is a flow diagram of an embodiment of a method of hiding information, generally designated 300, for use in a wireless communication network that includes a transmitter having a multi-element transmit antenna array conducted according to the principles of the present invention. In FIG. 3, the method 300 first performs initialization in a step 302.

After initialization, the method 300 determines if there is information to transmit in a decisional step 310. If there is information to transmit, the method 300 then scrambles the information across the multi-element antenna array of the transmitter in a step 320. The method 300 then reduces channel coherence randomly during transmission of the scrambled information via the multi-element transmit antenna array in a step 330. In one embodiment, the method 300 may reduce the channel coherence by pre-multiplying the scrambled information by a random matrix that is indistinguishable when transmitted. In another embodiment, the method 300 may reduce channel coherence between the multi-element antenna array of the transmitter and an antenna of a receiver.

The method 300 then transmits the scrambled information with the reduced channel coherence in a step 340. The method 300 may employ any number of or all of the elements of the multi-element antenna array of the transmitter to transmit the scrambled information with reduced channel coherence, thereby reducing an unauthorized eavesdropper's ability to determine the content or type of the transmitted information. Next, the method 300 returns to determine if there is more information to transmit in the decisional step 310.

If the method 300 determined that there was no information to transmit in the decisional step 310, the method 300 may then determine if the scrambled information produces an unacceptable number of errors when decoded at a receiver in a decisional step 350. If the number of errors are unacceptable, the method 300 may then re-adjust the channel coherence in order to re-establish valid communications in a step 360. The method 300 may cause the bandwidth of the random matrix used to artificially reduce channel coherence to be lowered in order to increase the channel coherence. In another embodiment, the method 300 determine if a receiver produces an unacceptable of number of errors when decoding scrambled information and then cause the channel coherence to be re-adjusted. The method 300 then returns to determine if there is more information to transmit in the decisional step 310. If the method 300 determined that the transmission is capable of being received in the decisional step 350, the method 300 then returns to determine if there is more information to transmit in the decisional step 310.

One skilled in the art should know that the present invention is not limited to performing functions sequentially. The present invention and method may perform multiple functions at the same time. Also, other embodiments of the present invention may have additional or fewer steps than described above.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

Although the present invention has been described in detail, those skilled in the art should understand that they can make various changes, substitutions and alterations herein without departing from the spirit and scope of the invention in its broadest form.

What is claimed is:

1. An information hiding system for use in a wireless communication network that includes a transmitter having a multi-element transmit antenna array, comprising:
    an information spreading subsystem configured to scramble information across said multi-element transmit antenna array; and
    a coherence modification subsystem configured to reduce channel coherence randomly during transmission of said scrambled information via said multi-element transmit antenna array by pre-multiplying said scrambled information before transmission by a random matrix that is indistinguishable when transmitted.

2. The information hiding system as recited in claim 1 wherein said random matrix should be chosen such that:

$$n\partial(\log H(t)M(t))/\partial t < B$$

where:
n is the number of elements in said multi-element transmit antenna array,
t is time,
H is a channel matrix for scrabbling said information over the number of antenna elements,
M is said random matrix, and
B is a signal bandwidth.

3. The information hiding system as recited in claim 1 wherein said information spreading subsystem is further configured to employ space-time diversity to scramble said information.

4. The information hiding system as recited in claim 1 wherein said coherence modification subsystem is further configured to reduce said channel coherence below a stabilized channel coherence between said multi-element transmit antenna array and a receiver.

5. The information hiding system as recited in claim 1 further comprising a coherence monitoring subsystem configured to determine when said scrambled information produces an unacceptable number of errors when decoded at a receiver and cause said coherence modification subsystem to re-adjust said channel coherence in order to re-establish valid communications.

6. A receiver for use in a wireless communication network, comprising:
    a coherence policer configured to determine when said receiver produces an unacceptable number of errors when decoding scrambled information from a transmitter configured to reduce channel coherence by pre-multiplying, before transmission to said receiver, said scrambled information by a random matrix that is indistinguishable when transmitted, said coherence policer further configured to and send a signal to said transmitter indicating that said channel coherence should be re-adjusted when said receiver produces said unacceptable number of errors.

7. A method of hiding information for use in a wireless communication network that includes a transmitter having a multi-element transmit antenna array, comprising:
    scrambling said information across said multi-element transmit antenna array; and
    reducing channel coherence randomly during transmission of said scrambled information via said multi-element transmit antenna array by pre-multiplying said scrambled information before transmission by a random matrix that is indistinguishable when transmitted.

8. The method as recited in claim 7 wherein said random matrix should be chosen such that:

$$n\partial(\log H(t)M(t))/\partial t < B$$

where:
n is the number of elements in said multi-element antenna array,
t is time,
H is a channel matrix for scrabbling said information over the number of antenna elements,
M is said random matrix, and
B is a signal bandwidth.

9. The method as recited in claim 7 wherein said scrambling further comprises employing space-time diversity to scramble said information.

10. The method as recited in claim 7 wherein said multi-element transmit antenna array has at least two transmit antenna elements, said reducing said channel coherence further comprises reducing said channel coherence between each of said at least two transmit antenna elements and at least one receive antenna.

11. The method as recited in claim 7 further comprising determining when said scrambled information produces an unacceptable number of errors when decoded at a receiver and re-adjusting said channel coherence in order to re-establish valid communications.

12. A wireless communication system for hiding information from an unauthorized eavesdropper, comprising:
    a transmitter having a multi-element transmit antenna array; and
    an information hiding system, including:
        an information spreading subsystem that scrambles said information across said multi-element transmit antenna array,
        a coherence modification subsystem that reduces channel coherence randomly during transmission of said scrambled information via said multi-element transmit antenna array by pre-multiplying said scrambled information before transmission by a random matrix that is indistinguishable when transmitted, and
        a coherence monitoring subsystem that determines when said scrambled information produces an unacceptable number of errors at a receiver and causes said coherence modification subsystem to re-adjust said channel coherence in order to re-establish valid communications.

13. The wireless communication system as recited in claim 12 wherein said random matrix should be chosen such that:

$$n\partial(\log H(t)M(t))/\partial t < B$$

where:
n is the number of elements in said multi-element antenna array,
t is time,
H is a channel matrix for scrabbling said information over the number of antenna elements,
M is said random matrix, and
B is a signal bandwidth.

14. The wireless communication system as recited in claim 12 wherein said information spreading subsystem employs space-time diversity to scramble said information.

15. The wireless communication system as recited in claim 12 wherein said coherence modification subsystem reduces said channel coherence below a stabilized channel coherence between each transmit element of said multi-element transmit antenna array and at least one receive antenna.

16. The wireless communication system as recited in claim 12 wherein said coherence monitoring subsystem further determines when said receiver produces an unacceptable of number of errors when decoding said scrambled information and causes said coherence modification subsystem to re-adjust said channel coherence in order to re-establish valid communications.

17. An information hiding system for use in a wireless communication network that includes a transmitter having a multi-element transmit antenna array, comprising:
an information spreading subsystem configured to scramble information across said multi-element transmit antenna array; and
a coherence modification subsystem configured to reduce channel coherence randomly during transmission of said scrambled information via said multi-element transmit antenna array, said channel coherence reduced below a stabilized channel coherence between said multi-element transmit antenna array and a receiver.

18. An information hiding system for use in a wireless communication network that includes a transmitter having a multi-element transmit antenna array, comprising:
an information spreading subsystem configured to scramble information across said multi-element transmit antenna array; and
a coherence modification subsystem configured to reduce channel coherence randomly during transmission of said scrambled information via said multi-element transmit antenna array, said multi-element transmit antenna array having at least two transmit antenna elements, said coherence modification subsystem further configured to reduce said channel coherence between each of said at least two transmit antenna elements and at least one receive antenna.

19. A method of hiding information for use in a wireless communication network that includes a transmitter having a multi-element transmit antenna array, comprising:
scrambling said information across said multi-element transmit antenna array; and
reducing channel coherence randomly during transmission of said scrambled information via said multi-element transmit antenna array, said channel coherence reduced below a stabilized channel coherence between said multi-element transmit antenna array and a receiver.

20. A method of hiding information for use in a wireless communication network that includes a transmitter having a multi-element transmit antenna array with at least two transmit antenna elements, comprising:
scrambling said information across said multi-element transmit antenna array; and
reducing channel coherence randomly during transmission of said scrambled information via said multi-element transmit antenna array by reducing said channel coherence between each of said at least two transmit antenna elements and at least one receive antenna.

21. A wireless communication system for hiding information from an unauthorized eavesdropper, comprising:
a transmitter having a multi-element transmit antenna array; and
an information hiding system, including:
an information spreading subsystem that scrambles said information across said multi-element transmit antenna array,
a coherence modification subsystem that reduces channel coherence randomly during transmission of said scrambled information via said multi-element transmit antenna array, said channel coherence reduced below a stabilized channel coherence between each transmit element of said multi-element transmit antenna array and at least one receive antenna, and
a coherence monitoring subsystem that determines when said scrambled information produces an unacceptable number of errors at a receiver and causes said coherence modification subsystem to re-adjust said channel coherence in order to re-establish valid communications.

* * * * *